United States Patent
Ke et al.

(10) Patent No.: US 11,252,044 B2
(45) Date of Patent: Feb. 15, 2022

(54) NETWORK TRAFFIC PREDICTION METHOD, APPARATUS, AND ELECTRONIC DEVICE

(71) Applicant: WANGSU SCIENCE & TECHNOLOGY CO., LTD., Shanghai (CN)

(72) Inventors: Wanwan Ke, Shanghai (CN); Qiantai Zhuang, Shanghai (CN); Shaohui Lin, Shanghai (CN); Yichao Chen, Shanghai (CN); Yahong Zhang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/043,639

(22) PCT Filed: Dec. 5, 2018

(86) PCT No.: PCT/CN2018/119359
§ 371 (c)(1),
(2) Date: Sep. 29, 2020

(87) PCT Pub. No.: WO2020/098016
PCT Pub. Date: May 22, 2020

(65) Prior Publication Data
US 2021/0021482 A1    Jan. 21, 2021

(30) Foreign Application Priority Data

Nov. 14, 2018  (CN) .......................... 201811354343.2

(51) Int. Cl.
| | | |
|---|---|---|
| *H04L 12/24* | (2006.01) | |
| *H04L 41/147* | (2022.01) | |
| *H04L 41/14* | (2022.01) | |

(52) U.S. Cl.
CPC .......... *H04L 41/147* (2013.01); *H04L 41/145* (2013.01)

(58) Field of Classification Search
CPC ..... H04L 47/70; H04L 63/10; H04L 41/0668; H04L 63/1441; H04L 41/12; H04L 41/16;
(Continued)

(56) References Cited

U.S. PATENT DOCUMENTS

| | | |
|---|---|---|
| 7,774,440 B1 | 8/2010 | Bagrodia et al. |
| 2012/0173719 A1 | 7/2012 | Hong et al. |

(Continued)

FOREIGN PATENT DOCUMENTS

| | | |
|---|---|---|
| CN | 102916851 A | 2/2013 |
| CN | 105376097 A | 3/2016 |

(Continued)

OTHER PUBLICATIONS

The China National Intelleectual Property Administration (CNIPA) The China Search Report for 201811354343.2 dated Jan. 2, 2020 12 Pages.

(Continued)

*Primary Examiner* — Djenane M Bayard (57) ABSTRACT

The present disclosure provides a network traffic prediction method, an apparatus and an electronic device. In the present disclosure, the network traffic prediction method includes establishing a higher-level network traffic prediction model, where the higher-level network traffic prediction model includes a linear model; using independent variables of the linear model in the higher-level network traffic prediction model as dependent variables, establishing at least one layer of a lower-level network traffic prediction model, and decomposing independent variables in the lower-level network traffic prediction model till all independent variables of each lower-level network traffic prediction model are
(Continued)

acquired naturally; and substituting a calculation model of the lower-level network traffic prediction model into the higher-level network traffic prediction model to obtain a complete network traffic prediction model.

20 Claims, 5 Drawing Sheets

(58) Field of Classification Search
CPC ... H04L 41/22; H04L 63/101; H04L 63/1433; H04L 63/20; H04L 63/205; H04L 41/044; H04L 41/0663; H04L 41/0686; H04L 41/0806; H04L 41/082; H04L 41/0843; H04L 41/0846; H04L 41/5016; H04L 41/5038; H04L 41/5067; H04L 43/08; H04L 43/0817; H04L 43/10; H04L 43/50; H04L 67/04; H04L 67/10; H04L 67/1048; H04L 67/1051; H04L 67/12; H04L 67/125; H04L 67/2823; H04L 67/34; H04L 69/40; H04L 9/0643; H04L 9/3239; H04L 2209/38; H04L 2209/56; H04L 9/0637; H04L 47/783; H04L 47/788; H04L 47/823; H04L 1/0002; H04L 1/0041; H04L 1/18; H04L 5/0064; H04L 67/1097; H04L 67/16; H04L 1/0009; H04L 67/2833; H04L 9/3236; H04L 1/0076; H04L 67/2809; H04L 1/0057; H04L 1/16; H04L 1/1854; H04L 1/1867; H04L 1/1874; H04L 27/0014; H04L 29/08783; H04L 29/08792; H04L 41/0826; H04L 41/084; H04L 41/142; H04L 41/145; H04L 41/147; H04L 43/024; H04L 43/0811; H04L 49/90; H04L 5/0008; H04L 63/00; H04L 67/20; H04L 67/306; H04L 67/32; H04L 67/322; H04L 69/16; H04L 9/3231
See application file for complete search history.

(56) References Cited

U.S. PATENT DOCUMENTS

| | | | | |
|---|---|---|---|---|
| 2015/0289149 | A1* | 10/2015 | Ouyang | H04W 16/18 370/252 |
| 2016/0078361 | A1* | 3/2016 | Brueckner | H04L 67/10 706/12 |
| 2016/0352584 | A1 | 12/2016 | Roy | |
| 2020/0136975 | A1* | 4/2020 | Arora | H04L 43/045 |

FOREIGN PATENT DOCUMENTS

| | | |
|---|---|---|
| CN | 105634787 A | 6/2016 |
| CN | 105787136 A | 7/2016 |
| CN | 106357456 A | 1/2017 |
| CN | 107026763 A | 8/2017 |
| CN | 107171848 A | 9/2017 |
| CN | 108733970 A | 11/2018 |
| CN | 108737455 A | 11/2018 |
| CN | 108768877 A | 11/2018 |

OTHER PUBLICATIONS

Xiaochao Dang et al,Traffic Flow Prediction Based on Multivariate Linear AR Model, Computer Engineering,Jan. 5, 2012, 84-86 pages,vol. 38 No. 1 2012.
The World Intellectual Property Organization (WIPO) International Search Report for PCT/CN2018/119359 Jul. 31, 2019 5 pages.

* cited by examiner

NETWORK TRAFFIC PREDICTION METHOD, APPARATUS, AND ELECTRONIC DEVICE

CROSS-REFERENCES TO RELATED APPLICATIONS

This application is a national phase entry under 35 U.S.C § 371 of International Application No. PCT/CN2018/119359 filed on Dec. 5, 2018, which claims priority of Chinese Patent Application No. 201811354343.2, filed with the State Intellectual Property Office of P. R. China on Nov. 14, 2018, the entire contents of all of which are incorporated herein by reference.

FIELD OF THE DISCLOSURE

Embodiments of the present disclosure generally relate to the technical field of Internet and, more particularly, relates to a network traffic prediction method, and an apparatus and an electronic device.

BACKGROUND

In the development of Internet technology, modeling and prediction research on network traffic has attracted substantial attention. Network traffic prediction models are the basis for network performance analysis and network design and planning. An accurate network traffic prediction model may accurately predict the traffic, which may be advantageous to understand the change trend of customer traffic and provide a necessary work preparation in advance for various traffic changes to ensure service quality.

In the big data background, the dramatic increase in network service categories has led to the network traffic property diversification, and the existing traffic prediction models may not be suitable for the traffic analysis and prediction of current and even next-generation Internet, so the network traffic prediction may be imperative. In the existing technology, various traffic prediction methods may have, but may not be limited to, the following problems:

1) a traffic prediction method based on time series is a method directly based on time series. Regardless of optimized time series models, the accuracy of the time series may not be effectively ensured and may be easily influenced by the nature of the historical periodicity in case of network anomaly or relatively strong human intervention; and 2) a traffic prediction method based on linear programming may be a simple model and fail to consider sufficient traffic influencing factors and fluctuation influences of periodicity, which may easily lead to over-fitting to fail the prediction.

Therefore, there is a need to build a new network traffic prediction method, capable of being adapted to the needs of new service development.

BRIEF SUMMARY OF THE DISCLOSURE

The objective of embodiments of the present disclosure is to provide a network traffic prediction method, and apparatus and electronic device, which may predict network traffic through a multiple layer network traffic prediction model, and explore the influence of different service level variables on bandwidth values, thereby more accurately predicting the bandwidth values of customer network traffic.

To solve the above-mentioned problems, the embodiments of the present disclosure may provide a network traffic prediction method, including:

establishing a higher-level network traffic prediction model, where the higher-level network traffic prediction model includes a linear model;

using independent variables of the linear model in the higher-level network traffic prediction model as dependent variables, establishing at least one layer of a lower-level network traffic prediction model, and decomposing independent variables in the lower-level network traffic prediction model till all independent variables of each lower-level network traffic prediction model are acquired naturally; and substituting a calculation model of the lower-level network traffic prediction model into the higher-level network traffic prediction model to obtain a complete network traffic prediction model.

The embodiments of the present disclosure may also provide a network traffic prediction apparatus, including:

a higher-level traffic prediction module, configured for establishing a higher-level network traffic prediction model, where the higher-level network traffic prediction model includes a linear model;

a lower-level traffic prediction module, configured for using independent variables of the linear model in the higher-level network traffic prediction model established in the higher-level traffic prediction module as dependent variables, establishing at least one layer of a lower-level network traffic prediction model, and decomposing independent variables in the lower-level network traffic prediction model till all independent variables of each lower-level network traffic prediction model are naturally acquired; and a superimposition module, configured for substituting a calculation model of the lower-level network traffic prediction model established in the lower-level traffic prediction module into the higher-level network traffic prediction model established in the higher-level traffic prediction module to obtain a complete network traffic prediction model.

The embodiments of the present disclosure may also provide an electronic device, including:

at least one processor and one memory communicatively connected to the at least one processor; where the memory stores instructions executable by the at least one processor; the instructions are executed by the at least one processor to enable the at least one processor to execute the above-mentioned network traffic prediction method.

The embodiments of the present disclosure may provide an electronic device, including:

a computer readable storage medium, which may store a computer program, where the computer program is executed by a processor to implement the above-mentioned network traffic prediction method.

Compared to the existing technology, in the embodiments of the present disclosure, hierarchical structure service factors influencing the traffic may be identified by subdividing customer service data and establishing a multiple layer traffic prediction model. The multiple layer traffic prediction model may include the higher-level network traffic prediction model and at least one layer of the lower-level network traffic prediction model, where the higher-level network traffic prediction model may include the linear model. Meanwhile, in a next layer network traffic prediction model, factor analysis and decomposition may be performed on each variable by using the independent variables of the linear model in the higher-level network traffic prediction model as the dependent variables and by using the variables in the lower-level network traffic prediction model as the independent variables. In addition, a new next layer traffic prediction model may be established based on the characteristics of the independent variables till the independent variables of each lower-level network traffic prediction model may be obtained naturally. Finally, the calculation model of the lower-level network traffic prediction model may be substituted into the higher-level network traffic prediction model to obtain the complete network traffic prediction model. The network traffic prediction method may explore the impact of the variables of different service layers on bandwidth values, thereby predicting the bandwidth values of the customer network traffic with higher accuracy. This method may also take into account the service periodic change, and also take into account the development characteristics and actual situations of the service, thereby effectively improving the prediction and management of the customer traffic change situations.

Furthermore, analyzing the service variables influencing the network traffic and establishing the traffic layer model according to the service variables specifically includes searching the service variables based on specific service characteristics; verifying whether the service variables pass parameter evaluation; if passed, establishing the traffic layer linear model between the service variables and traffic values of the traffic layer model; if not passed, configuring the traffic layer error compensation model of the traffic layer model according to influence magnitudes and effects of the service variables on the traffic values; and summing the established traffic layer linear model and the established traffic layer error compensation model to obtain a calculation model of the traffic layer model. In such way, the layer analysis on the different influencing factors of the traffic service may be performed based on the generation methods of the customer network traffic. The customer service variables may be analyzed from the horizontal perspective, and various service layer variables influencing the traffic may be aggregated to the traffic layer to establish the traffic layer linear model, and the error compensation model may be formed according to the historical abnormal fluctuations and influences.

Moreover, analyzing the service characteristics of the service variables to determine the calculation model of the next service layer model specifically includes verifying whether the service variables have periodicity and linearity; if the service variables have periodicity or linearity, establishing a service layer linear model between the service variables and the independent variables of the next service layer model; and if the service variables do not have periodicity and do not have linearity, qualitatively analyzing the service variables, and configuring a qualitative analysis model when a qualitative relationship exists. In such way, the customer service variables may be analyzed from the longitudinal latitude perspective; the calculation model of the service variable data may be determined according to the parameter analysis and evaluation results of the independent variables; and whether the current analysis layer has completed the decomposition of the service level may be verified. If the decomposition is not completed, the decomposition and analysis may continue till the independent variables of each model level may be explained and all independent variables may be obtained in a natural manner. By subdividing the generation methods of the customer network traffic, the periodic change which may take into account the service, and the traffic factor analysis and the prediction method which may take into account the development characteristics and actual situations of the service may be determined, and the reasonable traffic evaluation data model may be established. The technical solutions of the embodiments of the present disclosure may better illustrate the change rule between the independent variables and the dependent variables and may be more relevant to the actual service changes; and may further better illustrate the customer traffic changes.

BRIEF DESCRIPTION OF THE DRAWINGS

One or more embodiments are exemplified by the figures with reference to drawings. The exemplary descriptions do not limit the scope of the embodiments. Elements in the figures having the same reference numerals are denoted by similar elements. The figures in the drawings do not constitute a scale limitation unless otherwise specified.

DETAILED DESCRIPTION

To more clearly describe objectives, technical solutions and advantages of the present disclosure, the present disclosure is further illustrated in detail with reference to the accompanying drawings in conjunction with embodiments hereinafter. However, it is apparent to those skilled in the art that, in the various embodiments of the present disclosure, various technical details are set forth in order to provide readers with a better understanding of the present application. However, the technical solutions claimed in the present application may also be implemented without the technical details and various changes and modifications based on the embodiments hereinafter.

Figure 1:
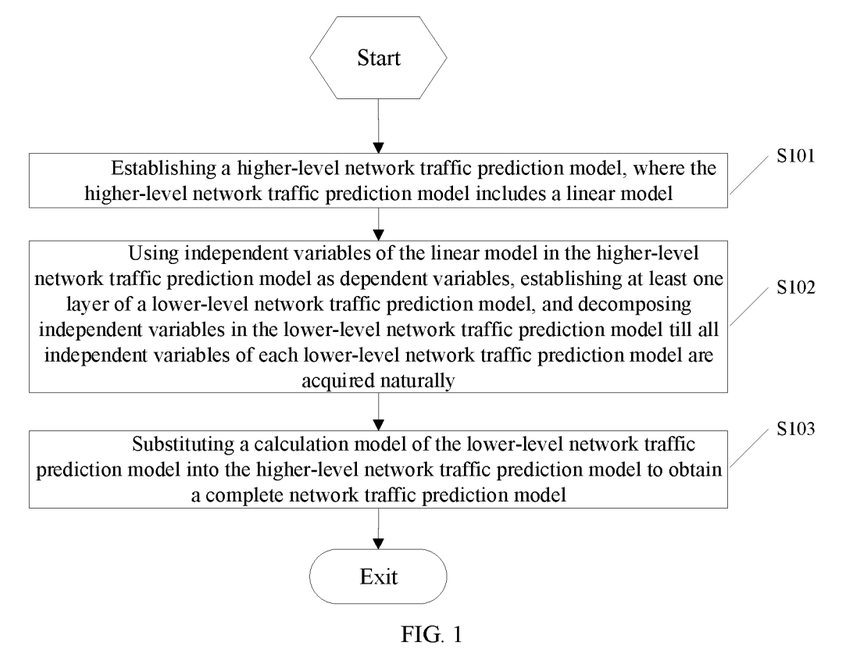
FIG. 1 illustrates a schematic flow chart of a network traffic prediction method according to a first embodiment of the present disclosure.

A first embodiment of the present disclosure relates to a network traffic prediction method. The specific process, shown in FIG. 1 includes:

step S101, establishing a higher-level network traffic prediction model, where the higher-level network traffic prediction model may include a linear model;

step S102, using independent variables of the linear model in the higher-level network traffic prediction model as dependent variables, establishing at least one layer of a lower-level network traffic prediction model, and decomposing independent variables in the lower-level network traffic prediction model till the independent variables of each lower-level network traffic prediction model may be naturally acquired; and step S103, substituting a calculation model of the lower-level network traffic prediction model into the higher-level network traffic prediction model to obtain a complete network traffic prediction model.

In one embodiment of the present disclosure, hierarchical structure service factors influencing the traffic may be identified by subdividing customer service data and establishing a multiple layer traffic prediction model. The multiple layer traffic prediction model may include the higher-level network traffic prediction model and at least one layer of the lower-level network traffic prediction model, where the higher-level network traffic prediction model may include the linear model. Meanwhile, in a next layer network traffic prediction model, factor analysis and decomposition may be performed on each variable by using the independent variables of the linear model in the higher-level network traffic prediction model as the dependent variables and by using the variables in the lower-level network traffic prediction model as the independent variables. In addition, a new next layer traffic prediction model may be established based on the characteristics of the independent variables till the independent variables of each lower-level network traffic prediction model may be obtained naturally. Finally, the calculation model of the lower-level network traffic prediction model may be substituted into the higher-level network traffic prediction model to obtain the complete network traffic prediction model. The network traffic prediction method may explore the impact of the variables of different service layers on bandwidth values, thereby predicting the bandwidth values of the customer network traffic with higher accuracy. This method may also take into account the service periodic change, and also take into account the development characteristics and actual situations of the service, thereby effectively improving the prediction and management of the customer traffic change situations.

A second embodiment of the present disclosure relates to a network traffic prediction method. The second embodiment may be substantially the same as the first embodiment. The main difference is that, in the second embodiment of the present disclosure, the higher-level network traffic prediction model may specifically include a traffic layer model located at an upper layer, and the lower-level network traffic prediction model may specifically include at least one service layer model, where the independent variables may be service variables. Hereinafter, the embodiment of the present disclosure may be described in detail with reference to FIG. 2.

Figure 2:
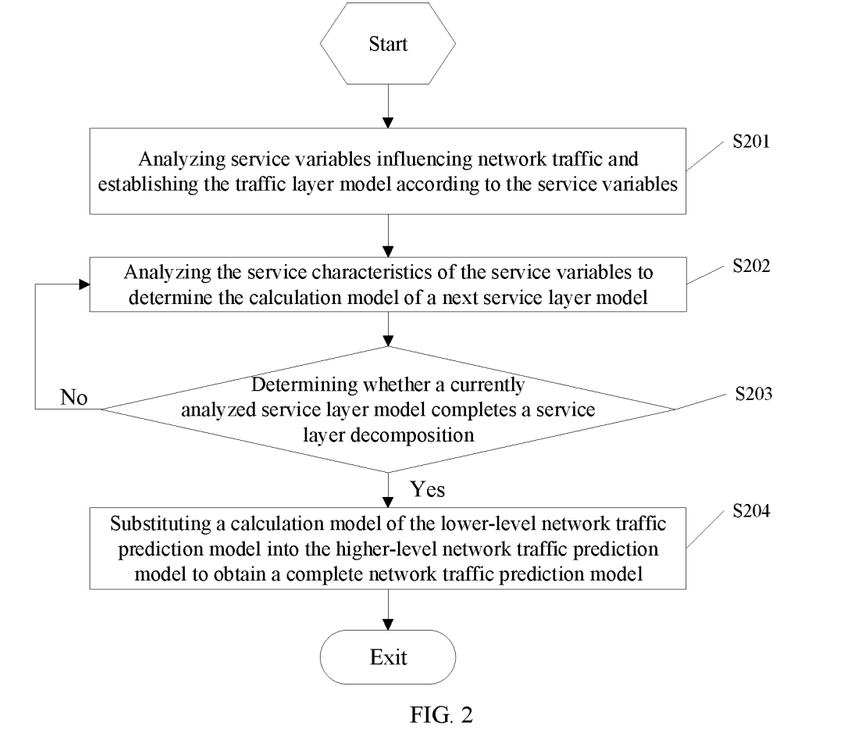
FIG. 2 illustrates a schematic flow chart of a network traffic prediction method according to a second embodiment of the present disclosure.

The second embodiment of the present disclosure relates to the network traffic prediction method. The specific process shown in FIG. 2 may include:

step S201, analyzing the service variables which may affect the network traffic and establishing the traffic layer model according to the service variables, where the traffic layer model may include a traffic layer linear model and a traffic layer error compensation model; before establishing the traffic layer model, it is necessary to firstly perform the hierarchical analysis on different influence factors of the traffic services according to customer service types; various service layer variables influencing the traffic may be firstly aggregated to the traffic layer to establish the traffic layer linear model, and the traffic layer error compensation model may be formed according to historical abnormal fluctuations and influences.

Figure 3:
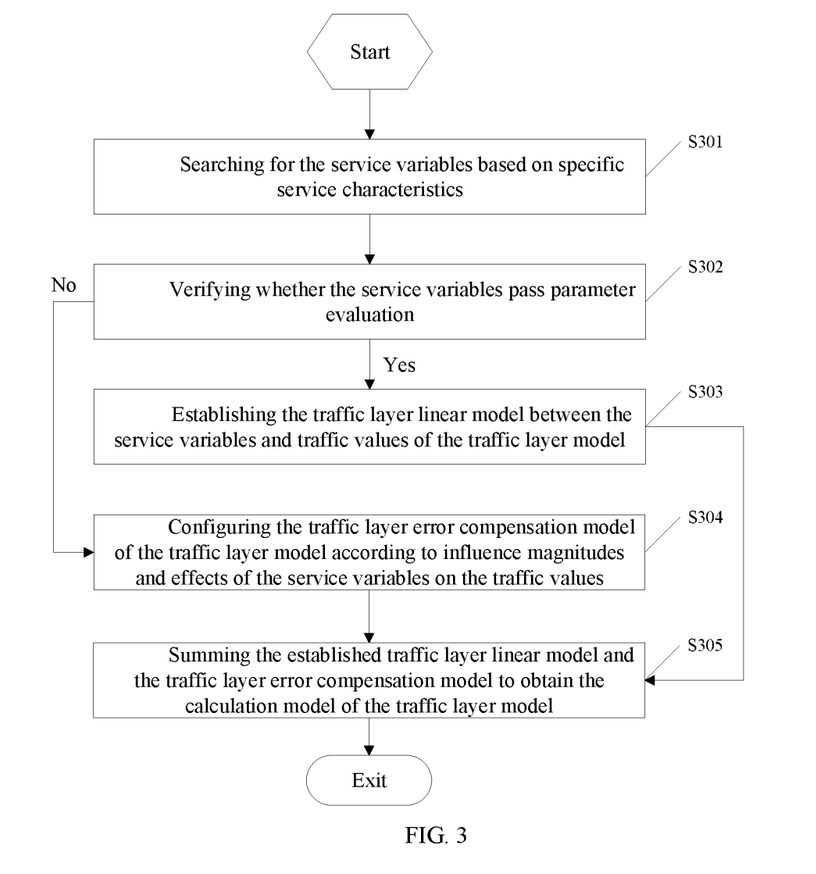
FIG. 3 illustrates a schematic flow chart according to an embodiment of a step S201 in FIG. 2.

The specific operation of the step, implemented by the process shown in FIG. 3, may specifically include the following.

In step S301, the service variables may be searched based on specific service characteristics, where it is necessary to search the service variables based on the characteristics of customer service process. Different customer types may have different influence factors of service models and traffic. Taking download as an example, factors influencing download traffic may include, but may not limited to, the size of download resource, the request number of the websites or forums corresponding to the download resource, the popularity of the event corresponding to the download resource, the user number for the download resource, the average speed for the download resource, etc. In the process of searching the service variables, it may firstly determine whether there are service variables; if the service variables are determined, the process may proceed to step S302; and if the service variables are not determined, the process may be exited.

In step S302, whether the service variables pass parameter evaluation may be verified.

The purpose of verifying whether the service variables pass the parameter evaluation is to establish the traffic prediction model based on the service variables, where the general parameter evaluation methods are an iterative generalized least squares method, a restricted generalized least squares method, and a Markov chain Monte Carlo method, which may be analyzed and determined by verifying whether linearity is between the service variables and the variables of the traffic layers, and whether the service variables are generally subject to normal distribution. If the service variables pass the parameter evaluation, the process may proceed to step S303. If the service variables do not pass the parameter evaluation, the process may proceed to step S304.

In step S303, the traffic layer linear model may be established between the service variables and the traffic values of the traffic layer model.

For example, the established traffic layer linear model between the service variables and the traffic values of the traffic layer model is:

$$Yx = A + B_1 Y_1 + B_2 Y_2 + \ldots + B_n Y_n$$

where, Yx is a target curve value of the traffic layer linear model, that is, a linear flow value; n≥1, which is a number of available service variables analyzed and evaluated from step S302; and A, B1, B2, ... $B_n$ are constants.

In step S304, the traffic layer error compensation model of the traffic layer model may be configured according to the influence magnitudes and effects of the service variables on the traffic values.

For example, the configured traffic layer error compensation model of the traffic layer model between the service variables and the traffic values of the traffic layer model is:

$$Ym = f(x_1) + f(x_2) \ldots + f(x_m)$$

where, Ym is a target curve value of the traffic layer error compensation model, that is, an error flow value; m≥0, which is a number of the service variables for the error compensation analyzed and evaluated from step S302.

In step S305, the established traffic layer linear model and the traffic layer error compensation model may be summed to obtain a calculation model of the traffic layer model.

According to the established traffic layer linear model and the traffic layer error compensation model in step S304 and step S305, the traffic layer model may be obtained, such as:

$$Y = Yx + Ym = A + B_1 Y_1 + B_2 Y_2 + \ldots + B_n Y_n + f(x_1) + f(x_2) \ldots + f(x_m)$$

where Y is the target curve value, that is, the network traffic value.

After establishing the higher-level network traffic prediction model, it is required to perform the following step: using the independent variables of the linear model in the higher-level network traffic prediction model as dependent variables, establishing at least one layer of a lower-level network traffic prediction model, and decomposing independent variables in the lower-level network traffic prediction model till the independent variables of each lower-level network traffic prediction model may be naturally acquired. Specifically, in one embodiment, after establishing the higher-level traffic layer model, it is required to establish at least one layer of the service layer model by using the independent variables (i.e., the service variables) of the traffic layer linear model in the traffic layer model as the dependent variables.

Specifically, that is, the independent variables (i.e., the service variables) of the traffic layer linear model may be used as the dependent variables; the variables of the first layer of the service layer model may be used as the independent variables; and a new service layer model may be established based on the characteristics of the independent variables. When establishing the service layer model, it is required to specifically analyze the service characteristics of the service variables, and the calculation model of the service variable data, including time series, linear regression, error compensation model, and the like, may be determined according to the parameter analysis evaluation results of the dependent variables in the service layer model. In addition, whether the current analysis layer has completed the service layer decomposition may be verified. If the decomposition is not completed, the analysis and decomposition may continue till the independent variables of each service layer may be explained and all of the independent variables may be obtained in a natural manner. That is, after performing step S201, the method may further include:

step S202, analyzing the service characteristics of the service variables to determine the calculation model of a next service layer model.

In this step, in the determination of the service layer model, the calculation model of the service variables (as the dependent variables) and the independent variables in the service layer model may firstly determine whether the service variables have periodicity or linearity in the specific implementation. If the service variables have periodicity or linearity, the service layer linear model between the service variables and the independent variables of the next service layer model may be established. If the service variables do not have periodicity and do not have linearity, the service variables may be qualitatively analyzed, and a qualitative analysis model may be configured when a qualitative relationship exists. However, when establishing the service layer linear model between the service variables and the independent variables of the next service layer model, the time series model or the linear model may be established according to the characteristics of the service variables.

Figure 4:
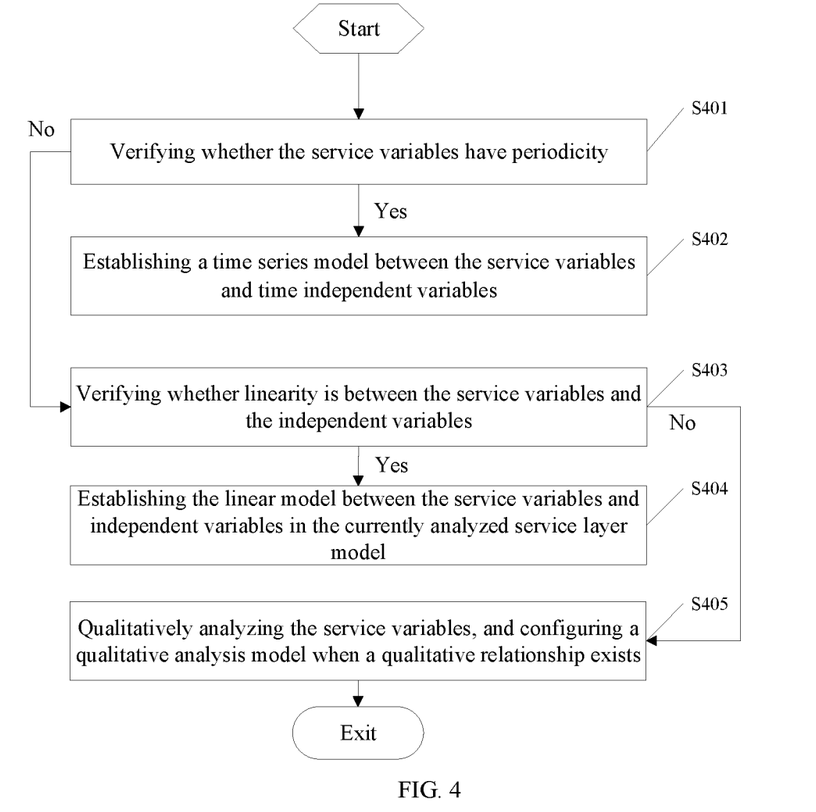
FIG. 4 illustrates a schematic flow chart according to an embodiment of a step S202 in FIG. 2.

The operation process shown in FIG. 4 may be used for the implementation hereinafter, which may specifically include the following.

Step S401, whether the service variables have periodicity may be verified.

Step S402, if the service variables have periodicity, the time series model may be established between the service variables and the time independent variables.

Step S403, if the service variables do not have periodicity, whether linearity is between the service variables and the independent variables may be further verified.

In step S401 to step S403, the analysis of the periodicity, normal distribution, and the like may be performed on the service variables such as Y1, Y2, . . . Yn and the like obtained by analyzing the traffic layer model. When the periodicity of the service variables is verified, a pure randomness verification and a stationarity verification of the variable sequences may be included, and the sequences may be divided into different types according to the verification results. Different analysis methods may be used for different sequence types, which may include:

i) for the pure randomness sequence, that is, a white-noise sequence, no correlation may be between terms of the sequence, and the sequence may undergo a completely disordered random fluctuation; the periodicity analysis of the sequence may be terminated, and the linearity analysis of step S403 may be proceeded;

ii) for the stationary non-white-noise sequence, the mean and variance may be constant, and the ARMA model (auto-regressive and moving average model) may be used as the stationary sequence fitting model, that is, step S402 may be proceeded; and iii) for the non-stationary sequence, which may be converted to the stationary sequence, if it is stationary after the difference operation, the sequence may be called as the differential stationary sequence, and the ARMA model (auto-regressive integrated moving average model) may be used for analysis and fitting, that is, step S402 may be proceeded; if it is not stationary, the linearity analysis of step S403 may also be adapted.

If the service variables are verified to have periodicity, the time series model between the service variables and the time independent variables may be established. For example, assuming the variable $Y_i$ is a time series object, $$Y_i = \begin{cases} AR(p) \\ ARMA(p, q) \\ MA(q) \end{cases}$$

can be established, where p is the order of autoregression, and q is the moving average term.

For the service variables that do not pass the periodicity verification, the linearity analysis treatment between the influence factors (independent variables) and the predicted objects (dependent variables, that is, the service variables) may be performed, and the correlation coefficient and linearity may be verified (that is, step S403).

Step S404, if the existing linearity is verified in step S403, the linear model between the service variables and the independent variables in the currently analyzed service layer model may be established, and finally the regression coefficients may be obtained to establish the regression equation.

For example, assuming that the variable $Y_j$ is a linearity object, $Y_j = a + b_1 z_1 + b_2 z_2 + \ldots + b_j z_j$ may be established, where $Y_i$ is the service variable of the traffic layer model, that is, the dependent variable of the currently analyzed service layer model; a, $b_1$, $b_2$ . . . $b_j$ are constants; $z_1$, $z_2$ . . . $z_j$ are the independent variables of the currently analyzed service layer, that is, the factors influencing $Y_j$.

When establishing the time series model between the service variables and the time dependent variables or establishing the linear model between the service variables and the independent variables in the currently analyzed service layer model, references may be made to step S302 to step S304. However, the decomposition of the independent variables of the traffic layer may be performed in step S302 to step S304, but the decomposition of the independent variables of the service layer may be performed in one embodiment.

Step S405, if the verification result in step S403 is no, the service variables may be qualitatively analyzed, and the qualitative analysis model may be configured when a qualitative relationship exists.

In the step, the service variables may be qualitatively analyzed. Assuming the service variable $Y_z$ is the qualitative variable, the qualitative analysis model may be configured as the following:

$$Y_z = f(c) = \begin{cases} 2, & 0 < c \leq 0.5 \\ 1.8, & 0.5 < c \leq 1 \\ 1.3, & 1 < c \leq 2 \\ \ldots \\ 1, & c > 2 \end{cases}$$

After completing step S201 and step S202, the method may further include the following.

S203, whether the currently analyzed service layer model completes the service layer decomposition may be determined.

In the step, whether the currently analyzed service layer model completes the analysis and evaluation of all service variables may be determined from a horizontal perspective. If the decomposition is determined to be completed, step S204 may be proceeded, and if the decomposition is not completed, step S202 may be proceeded.

S204, if the decomposition is completed, the calculation model of the lower-level network traffic prediction model may be substituted into the higher-level network traffic prediction model to obtain a complete network traffic prediction model.

When implementing this step, the traffic layer model and the lower-level service layer model may be specifically combined to obtain the complete network traffic prediction model:

$$Y = A + B_1 \begin{cases} AR(p) \\ ARMA(p, q) + B_z a + b_1\{z_1 + b_2 z_2 + \ldots + b_j z_j\} + \\ b_2 f(c) \ldots + B_n Y_n + f(x_1) + f(x_2) \ldots + f(x_m) \\ MA(q) \end{cases}$$

The network traffic prediction method according to the embodiments of the present disclosure may perform the layer analysis on the different influencing factors of the traffic service based on the generation methods of the customer network traffic. The customer service variables may be analyzed from the horizontal perspective, and various service layer variables influencing the traffic may be aggregated to the traffic layer to establish the traffic layer linear model, and the error compensation model may be formed according to the historical abnormal fluctuations and influences. Meanwhile, the customer service variables may be analyzed from the longitudinal latitude perspective, the calculation model of the service variable data may be determined according to the parameter analysis and evaluation results of the independent variables, and whether the current analysis layer has completed the decomposition of the service layer may be verified. If the decomposition is not completed, the decomposition and analysis may continue till the independent variables of each model layer may be explained and all independent variables may be obtained in a natural manner. The embodiments of the present disclosure may compensate for the influencing factors by establishing the multiple layer linear model and combining the error compensation model. By subdividing the generation methods of the customer network traffic, the periodic change which may take into account the service, and the traffic factor analysis and the prediction method which may take into account the development characteristics and actual situations of the service may be determined, and the reasonable traffic evaluation data model may be established.

The technical solutions of the embodiments of the present disclosure may better illustrate the change rule between the independent variables and the dependent variables and be more relevant to the actual service changes; and may further better illustrate the customer traffic changes.

The steps of the above-mentioned various embodiments may be divided for clear description. The steps may be combined into one step or certain steps may be split and decomposed into multiple steps during the implementation, as long as the same logical relationship may be included, which is within the protection scope of the present patent. Adding insignificant modifications or introducing insignificant designs to the algorithm or process without changing the core design of the algorithm and process is within the protection scope of the present patent.

Figure 5:
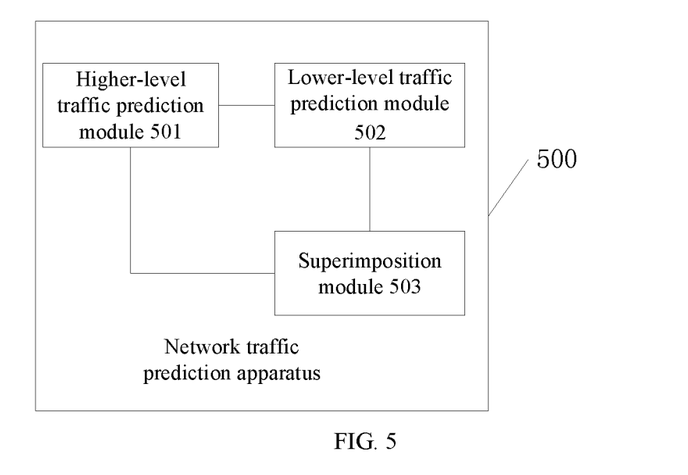
FIG. 5 illustrates a structural schematic of a network traffic prediction apparatus according to a third embodiment of the present disclosure.

A third embodiment of the present disclosure relates to a network traffic prediction apparatus 500 shown in FIG. 5, which may include:

a higher-level traffic prediction module 501, configured for establishing a higher-level network traffic prediction model, where the higher-level network traffic prediction model may include a linear model;

a lower-level traffic prediction module 502, configured for using independent variables of the linear model in the higher-level network traffic prediction model established by the higher-level traffic prediction module 501 as dependent variables, establishing at least one layer of a lower-level network traffic prediction model, and decomposing independent variables in the lower-level network traffic prediction model till the independent variables of each lower-level network traffic prediction model may be naturally acquired; and a superimposition module 503, configured for substituting a calculation model of the lower-level network traffic prediction model established by the lower-level traffic prediction module 502 into the higher-level network traffic prediction model established by the higher-level traffic prediction module 501 to obtain a complete network traffic prediction model.

The core of the embodiment of the present disclosure is to identify hierarchical structure service factors influencing the traffic by subdividing customer service data and establishing a multiple layer traffic prediction model. The multiple layer traffic prediction model may include the higher-level network traffic prediction model and at least one layer of the lower-level network traffic prediction model, where the higher-level network traffic prediction model may include the linear model. Meanwhile, in a next layer network traffic prediction model, factor analysis and decomposition may be performed on each variable by using the independent variables of the linear model in the higher-level network traffic prediction model as the dependent variables and by using the variables in the lower-level network traffic prediction model as the independent variables. In addition, a new next layer traffic prediction model may be established based on the characteristics of the independent variables till the independent variables of each lower-level network traffic prediction model may be obtained naturally. Finally, the calculation model of the lower-level network traffic prediction model may be substituted into the higher-level network traffic prediction model to obtain the complete network traffic prediction model. The network traffic prediction method may explore the impact of the variables of different service layers on bandwidth values, thereby predicting the bandwidth values of the customer network traffic with higher accuracy. This method may also take into account the service periodic change, and also take into account the development characteristics and actual situations of the service, thereby effectively improving the prediction and management of the customer traffic change situations.

It is not difficult to find that the embodiment may be a system embodiment corresponding to the first embodiment, and the embodiment may be implemented in cooperation with the first embodiment. The related technical details mentioned in the first embodiment may be still effective in the embodiment and may not be described in detail herein to reduce repetition. Accordingly, the related technical details mentioned in the embodiment may also be applied to the first embodiment.

It is worth mentioning that each module related to the embodiment is a logic module. In practical applications, one logic module may be a physical unit, may also be a portion of a physical unit, and may further be implemented by combining multiple physical units. In addition, in order to highlight the innovative part of the present disclosure, units which are be closely related to solving the technical problem proposed by the present disclosure may not be introduced, but it does not indicate that no other units are included in the embodiment.

A fourth embodiment of the present disclosure relates to a network traffic prediction apparatus 500. The fourth embodiment may be substantially the same as the third embodiment. The main difference is that, in the fourth embodiment, the higher-level network traffic prediction model may specifically include the traffic layer model at an upper layer; the lower-level network traffic prediction model may specifically include at least one service layer model; and the independent variables may be specifically service variables. A detailed description may be illustrated in FIG. 6 hereinafter, where the higher-level traffic prediction module may specifically be a traffic layer prediction module 5011.

Figure 6:
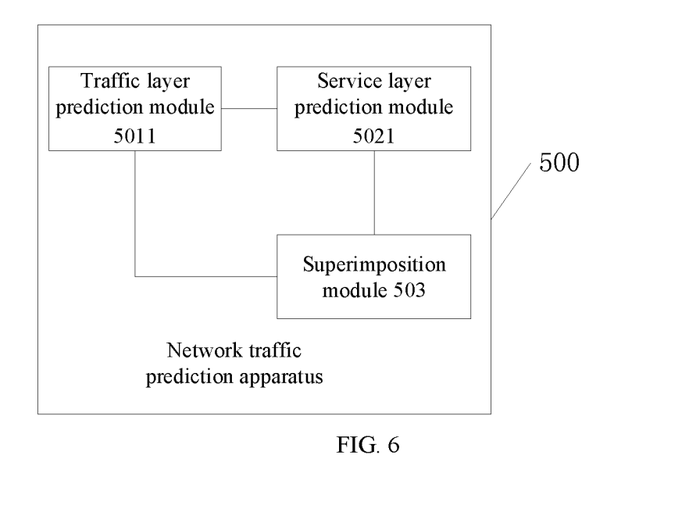
FIG. 6 illustrates a structural schematic of a network traffic prediction apparatus according to a four embodiment of the present disclosure.

The traffic layer prediction module 5011 may be configured for analyzing the service variables influencing the network traffic and establishing the traffic layer model according to the service variables, where the traffic layer model may include a traffic layer linear model and a traffic-layer error compensation model. Before establishing the traffic layer model, the traffic layer prediction module 5011 may firstly perform the hierarchical analysis on different influence factors of the traffic services according to customer service types; various service layer variables influencing the traffic may be firstly aggregated to the traffic layer to establish the traffic layer linear model, and the traffic layer error compensation model may be formed according to historical abnormal fluctuations and influences.

The traffic layer prediction module 5011 may search the service variables based on specific service characteristics and verify whether the service variables pass the parameter evaluation, where it is necessary to search the service variables based on the characteristics of customer service process. Different customer types may have different influence factors of service models and traffic. Taking download as an example, factors influencing download traffic may include, but may not limited to, the size of download resource, the request number of the websites or forums corresponding to the download resource, the popularity of the event corresponding to the download resource, the user number for the download resource, the average speed for the download resource, etc. In the process of searching the service variables, it may firstly determine whether there are service variables; if the service variables are determined, whether the service variables pass the parameter evaluation may be verified; and if the service variables are not determined, the process may be exited.

The purpose of verifying whether the service variables pass the parameter evaluation is to establish the traffic prediction model based on the service variables, where the general parameter evaluation methods are an iterative generalized least squares method, a restricted generalized least squares method, and a Markov chain Monte Carlo method, which may be analyzed and determined by verifying whether the linearity is between the service variables and the variables of the traffic layers, and whether the variables are generally subject to normal distribution.

When passing the parameter evaluation, the traffic layer linear model between the service variables and the traffic values of the traffic layer model may be established. For example, the established traffic layer linear model between the service variables and the traffic values of the traffic layer model is:

$$Yx = A + B_1 Y_1 + B_2 Y_2 + \ldots + B_n Y_n$$

where, Yx is a target curve value of the traffic layer linear model, that is, a linear flow value; n≥1, which is a number of available service variables from analysis and evaluation; and A, B1, B2, . . . Bn are constants.

When the parameter evaluation does not pass, the traffic layer error compensation model of the traffic layer model may be configured according to the influence magnitudes and effects of the service variables on the traffic values. For example, the configured traffic layer error compensation model of the traffic layer model between the service variables and the traffic values of the traffic layer model is:

$$Ym = f(x_1) + f(x_2) \ldots + f(x_m)$$

where, Ym is a target curve value of the traffic layer error compensation model, that is, an error flow value; m≥1, which is a number of variables for the error compensation from analysis and evaluation.

Lastly, the established traffic layer linear model and the traffic layer error compensation model may be summed to obtain a calculation model of the traffic layer model. For example, the obtained traffic layer model is:

$$Y = Yx + Ym = A + B_1 Y_1 + B_2 Y_2 + \ldots + B_n Y_n + f(x_1) + f(x_2) \ldots + f(x_m)$$

where, Y is a target curve value, that is, a network traffic value.

The lower-level traffic prediction module may be specifically a service layer prediction module 5021.

After establishing the higher-level network traffic prediction model, it is required to perform the following step: using independent variables of the linear model in the higher-level network traffic prediction model as dependent variables, establishing at least one layer of a lower-level network traffic prediction model, and decomposing independent variables in the lower-level network traffic prediction model till the independent variables of each lower-level network traffic prediction model may be naturally acquired. Specifically, in one embodiment, after establishing the higher-level traffic layer model, it is required to establish at least one layer of the service layer model by using the independent variables (i.e., the service variables) of the traffic layer linear model in the traffic layer model as the dependent variables by the service layer prediction module 5021.

The service layer prediction module 5021 may be configured for analyzing the service characteristics of the service variables to determine the calculation model of the next service layer model. When determining the calculation model of the service variables (as the dependent variables) and the independent variables in the service layer model, the operation process may be, for example, whether the service variables have periodicity or linearity may be determined firstly. If the service variables have periodicity or linearity, the service layer linear model between the service variables and the independent variables of the next service layer model may be established. If the service variables do not have periodicity and do not have linearity, the service variables may be qualitatively analyzed, and a qualitative analysis model may be configured when a qualitative relationship exists. However, when establishing the service layer linear model between the service variables and the independent variables of the next service layer model, the time series model or the linear model may be established according to the characteristics of the service variables.

In the specific implementation, whether the service variables have periodicity may be verified firstly. If the service variables have periodicity, the time series model between the service variables and the time independent variables may be established. For example, assuming the variable $Y_i$ is a time series object, $$Y_t = \begin{cases} AR(p) \\ ARMA(p, q) \\ MA(q) \end{cases}$$

can be established, where p is an order of autoregression, and q is a moving average term.

If the service variables do not have periodicity, whether the linearity is between the service variables and the independent variables may be further verified. If the existing linearity is verified, the linear model between the service variables and the independent variables in the currently analyzed service layer model may be established, and finally the regression coefficients may be obtained to establish the regression equation. For example, assuming that the variable $Y_j$ is a linear relationship object, it may establish:

where $Y_j$ is the service variable of the traffic layer model, that is, the dependent variable of the currently analyzed service layer model; a, $b_1$, $b_2$ . . . $b_j$ are constants; $z_1$, $z_2$ . . . $z_j$ are the independent variables of the currently analyzed service layer, that is, factors influencing $Y_j$.

When establishing the time series model between the service variables and the time dependent variables or establishing the linear model between the service variables and the independent variables in the currently analyzed service layer model, references may be made to step S302 to step S304. However, the decomposition of the independent variables of the traffic layer may be performed in step S302 to step S304, but the decomposition of the independent variables of the service layer may be performed in one embodiment.

If the service variables do not have periodicity and do not have linearity, the service variables may be qualitatively analyzed, and the qualitative analysis model may be configured when a qualitative relationship exists. The service variables may be qualitatively analyzed. Assuming the service variable $Y_z$ is a qualitative variable, the qualitative analysis model may be configured as the following:

$$Y_z = f(c) = \begin{cases} 2, & 0 < c \leq 0.5 \\ 1.8, & 0.5 < c \leq 1 \\ 1.3, & 1 < c \leq 2 \\ \ldots \\ 1, & c > 2 \end{cases}$$

After analyzing the service characteristics of the service variables to determine the calculation model of the next service layer model, whether the currently analyzed service layer model completes the service layer decomposition may be determined by the service layer traffic module 5021. If the decomposition is not completed, the independent variables of the linear model in the currently analyzed service layer model may be used as the dependent variables, and then the performing step of analyzing the service characteristics of the service variables to determine the calculation model of the next service layer model may be returned. If the decomposition is completed, the calculation model of the service layer model may be substituted into the traffic layer prediction model by the superposition module 503 to obtain the complete network traffic prediction model.

The network traffic prediction apparatus according to the embodiments of the present disclosure may perform the layer analysis on the different influencing factors of the traffic service based on the generation methods of the customer network traffic. The customer service variables may be analyzed from the horizontal perspective, and various service layer variables influencing the traffic may be aggregated to the traffic layer to establish the traffic layer linear model, and the error compensation model may be formed according to the historical abnormal fluctuations and influences. Meanwhile, the customer service variables may be analyzed from the longitudinal latitude perspective, the calculation model of the service variable data may be determined according to the parameter analysis and evaluation results of the independent variables, and whether the current analysis layer has completed the decomposition of the service level may be verified. If the decomposition is not completed, the decomposition and analysis may continue till the independent variables of each model layer may be explained and all independent variables may be obtained in a natural manner. The embodiments of the present disclosure may compensate for the influencing factors by establishing the multiple layer linear model and combining the error compensation model. By subdividing the generation methods of the customer network traffic, the periodic change which may take into account the service, and the traffic factor analysis and the prediction method which may take into account the development characteristics and actual situations of the service may be determined, and the reasonable traffic evaluation data model may be established. The technical solutions of the embodiments of the present disclosure may better illustrate the change rule between the independent variables and the dependent variables and be more relevant to the actual service changes; and may further better illustrate the customer traffic changes.

The embodiment may correspond to the second embodiment, so the embodiment may be implemented in cooperation with the second embodiment. The related technical details mentioned in the second embodiment may be still effective in the embodiment and may not be described in detail herein to reduce repetition. Accordingly, the related technical details mentioned in the embodiment may also be applied to the second embodiment.

A fifth embodiment of the present disclosure relates to an electronic device including at least one processor and a memory communicatively connected to the at least one processor.

The memory may store instructions executable by the at least one processor. The instructions may be executed by the at least one processor to enable the at least one processor to execute any of network traffic prediction methods in the first and second embodiments.

The memory and the processor may be connected by a bus which may include any number of interconnected buses and bridges; and the bus may connect various circuits of one or more processors and memories. The bus may also connect various other circuits, such as peripherals, voltage regulators, power management circuits, and the like, which are well known in the art, so it may not be further described in the disclosure. The bus interface may provide an interface between the bus and a transceiver. The transceiver may be an element or a plurality of elements, such as a plurality of receivers and transmitters, which may be the elements communicating with various other devices on a transmission medium. The data processed by the processor may be transmitted in a wireless medium through an antenna. Furthermore, the antenna may receive data and transmit data to the processor.

The processor may be responsible for managing the bus and normal processing, and may also provide various functions including timing, peripheral interfaces, voltage regulation, power management, and other control functions. However, the memory may be used to store data used by the processor when performing operations.

A sixth embodiment of the disclosure relates to a computer readable storage medium, which may store a computer program. The above-mentioned embodiments may be implemented when the computer program is executed by the processor.

That is, those skilled in the art may understand that all or part of the steps in the methods of the above-mentioned embodiments may be implemented by related hardware instructed by the program. The program may be stored in the storage medium and may include instructions which may enable a device (may be a microcontroller, a chip, etc.) or a processor to execute all or part of the steps in the method of each of the above-mentioned embodiments of the present application. In addition, the above-mentioned storage medium may include a U disk, a mobile hard disk, a read-only memory (ROM) and a random-access memory (RAM), a magnetic disk, or an optical disk, and the like.

Those skilled in the art may understand that the above-mentioned embodiments are specific embodiments for implementing the present disclosure. However, in the actual applications, various changes may be made in form and detail without departing from the spirit and scope of the disclosure.

What is claimed is:

1. A network traffic prediction method, comprising:
  establishing a higher-level network traffic prediction model, wherein the higher-level network traffic prediction model includes a linear model;
  using independent variables of the linear model in the higher-level network traffic prediction model as dependent variables, establishing at least one layer of a lower-level network traffic prediction model, and decomposing independent variables in the lower-level network traffic prediction model till all independent variables of each lower-level network traffic prediction model are acquired naturally; and
  substituting a calculation model of the lower-level network traffic prediction model into the higher-level network traffic prediction model to obtain a complete network traffic prediction model.

2. The network traffic prediction method according to claim 1, wherein the higher-level network traffic prediction model includes a traffic layer model, and establishing the higher-level network traffic prediction model specifically includes:
  analyzing service variables influencing network traffic and establishing the traffic layer model according to the service variables, wherein the traffic layer model includes a traffic layer linear model and a traffic layer error compensation model.

3. The network traffic prediction method according to claim 2, wherein analyzing the service variables influencing the network traffic and establishing the traffic layer model based on the service variables specifically includes:
  searching for the service variables base on specific service characteristics;
  verifying whether the service variables pass parameter evaluation;
  if passed, establishing the traffic layer linear model between the service variables and traffic values of the traffic layer model;
  if not passed, configuring the traffic layer error compensation model of the traffic layer model according to influence magnitudes and effects of the service variables on the traffic values; and
  summing the established traffic layer linear model and the traffic layer error compensation model to obtain the calculation model of the traffic layer model.

4. The network traffic prediction method according to claim 2, wherein:
  the lower-level network traffic prediction model includes a service layer model, and the independent variables are the service variables specifically; and
  using the independent variables of the linear model in the higher-level network traffic prediction model as the dependent variables, establishing at least one layer of the lower-level network traffic prediction model, and decomposing the independent variables in the lower-level network traffic prediction model till the independent variables of each lower-level network traffic prediction model are naturally acquired specifically includes:
    analyzing the service characteristics of the service variables to determine the calculation model of a next service layer model;
    determining whether a currently analyzed service layer model completes a service layer decomposition;
    if the decomposition is not completed, returning to perform a step of analyzing the service characteristics of the service variables to determine the calculation model of the next service layer model; and
    if the decomposition is completed, exiting a loop process.

5. The network traffic prediction method according to claim 4, wherein analyzing the service characteristics of the service variables to determine the calculation model of the next service layer model specifically includes:
  verifying whether the service variables have periodicity or linearity;
  if the service variables have periodicity or linearity, establishing a service layer linear model between the service variables and the independent variables of the next service layer model; and if the service variables do not have periodicity and do not have linearity, qualitatively analyzing the service variables, and configuring a qualitative analysis model when a qualitative relationship exists.

6. The network traffic prediction method according to claim 5, wherein verifying whether the service variables have periodicity or linearity, and establishing the service layer linear model between the service variables and the independent variables of the next service layer model includes:

verifying whether the service variables have periodicity;

if the service variables have periodicity, establishing a time series model between the service variables and time independent variables;

if the service variables do not have periodicity, further verifying whether linearity is between the service variables and the independent variables; and if the linearity exists, establishing the linear model between the service variables and independent variables in the currently analyzed service layer model.

7. The network traffic prediction method according to claim 6, wherein verifying whether the service variables have periodicity includes:

performing a pure randomness verification and a stationarity verification of the service variables.

8. An electronic device, comprising:

at least one processor; and one memory communicatively connected to the at least one processor, wherein:

the memory stores instructions executable by the at least one processor, the instructions are executed by the at least one processor to execute a network traffic prediction method, and the at least one processor is configured to:

establish a higher-level network traffic prediction model, wherein the higher-level network traffic prediction model includes a linear model;

use independent variables of the linear model in the higher-level network traffic prediction model as dependent variables, establish at least one layer of a lower-level network traffic prediction model, and decompose independent variables in the lower-level network traffic prediction model till all independent variables of each lower-level network traffic prediction model are acquired naturally; and substitute a calculation model of the lower-level network traffic prediction model into the higher-level network traffic prediction model to obtain a complete network traffic prediction model.

9. The device according to claim 8, wherein the higher-level network traffic prediction model includes a traffic layer model, and the at least one processor is further configured to:

analyze service variables influencing network traffic and establish the traffic layer model according to the service variables, wherein the traffic layer model includes a traffic layer linear model and a traffic layer error compensation model.

10. The device according to claim 9, wherein the at least one processor is further configured to:

search for the service variables base on specific service characteristics;

verify whether the service variables pass parameter evaluation;

if passed, establish the traffic layer linear model between the service variables and traffic values of the traffic layer model;

if not passed, configure the traffic layer error compensation model of the traffic layer model according to influence magnitudes and effects of the service variables on the traffic values; and sum the established traffic layer linear model and the traffic layer error compensation model to obtain the calculation model of the traffic layer model.

11. The device according to claim 9, wherein:

the lower-level network traffic prediction model includes a service layer model, and the independent variables are the service variables specifically; and the at least one processor is further configured to:

analyze the service characteristics of the service variables to determine the calculation model of a next service layer model;

determine whether a currently analyzed service layer model completes a service layer decomposition;

if the decomposition is not completed, return to analyze the service characteristics of the service variables to determine the calculation model of the next service layer model; and if the decomposition is completed, exit a loop process.

12. The device according to claim 11, wherein the at least one processor is further configured to:

verify whether the service variables have periodicity or linearity;

if the service variables have periodicity or linearity, establish a service layer linear model between the service variables and the independent variables of the next service layer model; and if the service variables do not have periodicity and do not have linearity, qualitatively analyze the service variables, and configure a qualitative analysis model when a qualitative relationship exists.

13. The device according to claim 12, wherein the at least one processor is further configured to:

verify whether the service variables have periodicity;

if the service variables have periodicity, establish a time series model between the service variables and time independent variables;

if the service variables do not have periodicity, further verify whether linearity is between the service variables and the independent variables; and if the linearity exists, establish the linear model between the service variables and independent variables in the currently analyzed service layer model.

14. The device according to claim 13, wherein the at least one processor is further configured to:

perform a pure randomness verification and a stationarity verification of the service variables.

15. A non-transitory computer readable storage medium, storing a computer program, wherein, the computer program is executed by a processor to implement a network traffic prediction method, the method comprising:

establishing a higher-level network traffic prediction model, wherein the higher-level network traffic prediction model includes a linear model;

using independent variables of the linear model in the higher-level network traffic prediction model as dependent variables, establishing at least one layer of a lower-level network traffic prediction model, and decomposing independent variables in the lower-level network traffic prediction model till all independent variables of each lower-level network traffic prediction model are acquired naturally; and substituting a calculation model of the lower-level network traffic prediction model into the higher-level network traffic prediction model to obtain a complete network traffic prediction model.

16. The storage medium according to claim 15, wherein the higher-level network traffic prediction model includes a traffic layer model, and establishing the higher-level network traffic prediction model specifically includes:
analyzing service variables influencing network traffic and establishing the traffic layer model according to the service variables, wherein the traffic layer model includes a traffic layer linear model and a traffic layer error compensation model.

17. The storage medium according to claim 16, wherein analyzing the service variables influencing the network traffic and establishing the traffic layer model based on the service variables specifically includes:
searching for the service variables base on specific service characteristics;
verifying whether the service variables pass parameter evaluation;
if passed, establishing the traffic layer linear model between the service variables and traffic values of the traffic layer model;
if not passed, configuring the traffic layer error compensation model of the traffic layer model according to influence magnitudes and effects of the service variables on the traffic values; and
summing the established traffic layer linear model and the traffic layer error compensation model to obtain the calculation model of the traffic layer model.

18. The storage medium according to claim 16, wherein:
the lower-level network traffic prediction model includes a service layer model, and the independent variables are the service variables specifically; and
using the independent variables of the linear model in the higher-level network traffic prediction model as the dependent variables, establishing at least one layer of the lower-level network traffic prediction model, and decomposing the independent variables in the lower-level network traffic prediction model till the independent variables of each lower-level network traffic prediction model are naturally acquired specifically includes:
analyzing the service characteristics of the service variables to determine the calculation model of a next service layer model;
determining whether a currently analyzed service layer model completes a service layer decomposition;
if the decomposition is not completed, returning to perform a step of analyzing the service characteristics of the service variables to determine the calculation model of the next service layer model; and
if the decomposition is completed, exiting a loop process.

19. The storage medium according to claim 18, wherein analyzing the service characteristics of the service variables to determine the calculation model of the next service layer model specifically includes:
verifying whether the service variables have periodicity or linearity;
if the service variables have periodicity or linearity, establishing a service layer linear model between the service variables and the independent variables of the next service layer model; and
if the service variables do not have periodicity and do not have linearity, qualitatively analyzing the service variables, and configuring a qualitative analysis model when a qualitative relationship exists.

20. The storage medium according to claim 19, wherein verifying whether the service variables have periodicity or linearity, and establishing the service layer linear model between the service variables and the independent variables of the next service layer model includes:
verifying whether the service variables have periodicity;
if the service variables have periodicity, establishing a time series model between the service variables and time independent variables;
if the service variables do not have periodicity, further verifying whether linearity is between the service variables and the independent variables; and
if the linearity exists, establishing the linear model between the service variables and independent variables in the currently analyzed service layer model.

* * * * *